United States Patent [19]
Hall

[11] Patent Number: 5,018,195
[45] Date of Patent: May 21, 1991

[54] FULLY INTEGRATED TELECOMMUNICATION NETWORK

[75] Inventor: Lawrence M. Hall, Hilversum, Netherlands

[73] Assignee: U.S. Philips Corporation, New York, N.Y.

[21] Appl. No.: 412,966

[22] Filed: Sep. 26, 1989

[30] Foreign Application Priority Data

Sep. 30, 1988 [NL] Netherlands ................. 8802410

[51] Int. Cl.$^5$ ............................................. H04M 7/00
[52] U.S. Cl. ..................................... 379/225; 379/219; 379/240
[58] Field of Search ............... 379/219, 225, 229, 230, 379/240, 241; 370/58.1, 58.2, 58.3, 62, 60

[56] References Cited

U.S. PATENT DOCUMENTS

4,723,272 2/1988 Maat .................................. 379/230
4,811,334 3/1989 Matt .................................. 379/230

OTHER PUBLICATIONS

L. M. Hall, "System Management in a Fully Integrated Network of SOPHO-S2500 PABX's", Philips TDS Review, vol. 46, No. 1, Mar. 1988, pp. 29–41.

Primary Examiner—James L. Dwyer
Attorney, Agent, or Firm—Anne E. Barschall

[57] ABSTRACT

In order to extend a new unit to a telecommunication network comprising a plurality of units often distributed geographically and interconnected by means of transmission lines, or adapting the software of the various units, without causing problems with the control communication between the units, the control communication is divided into a number of successive levels, for each level, specifically for the lowest level while a code number belonging to the software of this unit is stored in each unit. Communication between two units at a specific level is only possible if the code numbers match and if at all lower levels communication already takes place.

12 Claims, 1 Drawing Sheet

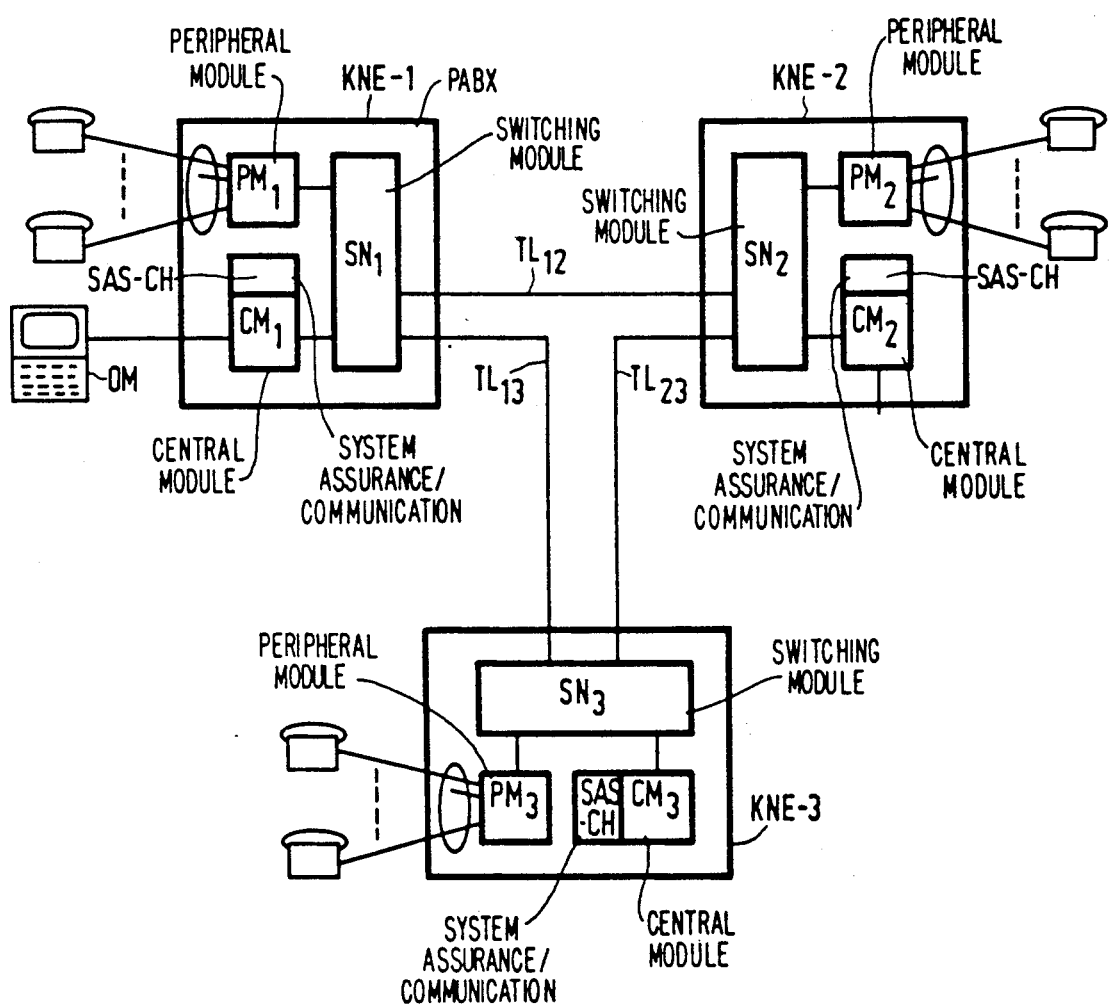

FULLY INTEGRATED TELECOMMUNICATION NETWORK

BACKGROUND OF THE INVENTION

1. Field of the Invention

The invention relates to a telecommunication network, more specifically a telephone network, which comprises a number of units interconnected by means of transmission lines, each unit comprising a switching module, a central module and at least a single peripheral module to which user gates can be connected.

2. Related Art

Such a telecommunication network is described in the article entitled "System Management in a fully integrated network of SOPHO-S2500 PABXs" by L. M. Hall in Philips TDS Review, Vol. 46, No. 1, March 1988, pp. 29-41. This article describes a fully integrated telecommunication network whose units may be geographically distributed for adapting the network to the geographic distribution of the company or organisation using the network, whereas the network appears to the user to operate as a single exchange. The article describes in what way the configuration of such a network is to be managed, how it is to be maintained and how the data of the users are to be processed, for example, when moving extensions, modifying classes of traffic and so on.

SUMMARY OF THE INVENTION

This invention is aimed at the problems which may occur in the control communication when a new unit, which has not yet been tested in a network environment, is intended to be included in such a network and when there is a desire to adapt the software available in the existing units, for example, to a new version of the software, and is intended to provide an adequate solution to these problems.

For this purpose, the invention provides a telecommunication network of the type mentioned hereinbefore in which a number of progressively higher levels are assigned to the control communication between any pair of units. In each unit for each level with the exception of the lowest level, a code number is stored. The invention includes means for allowing communication between a pair of units at a specific level only if the code numbers of the two units match for the relevant level and if communication between these units already takes place at all lower levels.

In this manner it is ensured that two units can communicate with each other only when the code number indicating which type of software is available in the unit for a specific communication level corresponds with the code number of the other unit. Since the comparison of the code numbers takes place for all communication levels, it is indeed possible for two units to communicate with each other at a specific level which is not the highest level but not at a higher level. The checking of the code number is effected not only when there is communication between two units already incorporated in a network but also between a unit incorporated in the network and a unit that still has to be incorporated.

In this manner it is possible to adapt the software of the various units consecutively, even if the new software cannot correctly co-operate with the old software at one or more levels. The units whose software has not yet been adapted can continue to communicate with each other, which also applies to units in which the software has already been adapted. However, a unit having the old software (at a certain level) will not be able to communicate with a unit having the new software.

In a preferred embodiment of the invention, an additional condition is made before creating a possibility to communicate, that the communication between the two units at the relevant level should not be forbidden. If, prior to this action, one of the two units, mostly a new one, is forbidden to communicate at a certain level, communication is obviously to be precluded, even though the code numbers of the units match and even though communication is already taking place at all lower levels.

BRIEF DESCRIPTION OF THE DRAWING

The invention will be further explained hereinbelow by means of an embodiment with reference to the drawing in which the FIGURE shows a general block diagram of a telecommunication network, more specifically, a telephone network intended for private use of the type to which the invention relates.

DETAILED DESCRIPTION OF THE PREFERRED EMBODIMENT

Such a network, which is described in more detail in Philips Telecommunication Review, Vol. 43, No. 2, 1985, comprises in general a plurality of adequately selected units KNE-1, 2, 3, . . . , n, interconnected by means of transmission lines through which PCM transmission is possible. For example, 2 Mb/s transmission lines can be used for this purpose which may carry, for example, 30 PCM channels through which the communication between the units can be effected. These units may be installed distributed over an adequately chosen geographical area such as, for example, a company site, a town, counties and so on. In this context we may think of a large company with various regional plants for which such a telecommunication network at large is available.

Each unit, more specifically a PABX, comprises a switching module SN, a central module CM, a System Assurance Communication Handler SAS-CH and at least one peripheral module PM. The switching module comprises a digital switch matrix and arrangements for providing clock signalling for PCM transmission. The central module performs the management function required for the unit itself as well as the communication to other units. A peripheral module performs preprocessing functions, for example, signalling conversions for a group of, for example, 128 user gates. The function of the System Assurance Communication Handler will be further explained hereinbelow.

For communication with arrangements which are to be considered external with respect to a relevant unit, such a unit may comprise interfaces for analog transmission lines forming a coupling to the public telephone switching networks, for analog connecting lines to other PBAX networks, and for PCM-30 digital lines forming a coupling to the public and private networks.

Each unit of such a telecommunication network, only three of which being shown in the Figure, is independent, the facilities are transparent throughout the network and a completely free numbering is provided. The data incorporated in this network are generally to be divided into local data which are unique to a single unit, and network data which are of a more general nature and which have equal contents for the units in question. In order to ensure data integrity for the whole network, an updating mechanism is available for the network data stored in each unit.

For completeness it is observed that the configuration of a communication network of the type to which the invention relates may be selected at random. As circumstances require, such a configuration may have a star structure, mesh structure or a combination of the two.

According to the invention each unit further includes a System Assurance Communication Handler (SAS-CH) which actually forms part of the central module CM. The communication between the SAS-CHs in the various units forms part of the basic communication between the units. This basic communication further includes anything necessary for the error-free transport of control information between the units as well as the necessary steps for opening a communication channel between two units, checking this channel for errors, so as to close it if errors are detected and for detecting whether a channel previously unsuitable for communication may operate properly again at a later stage. For a further description of the basic communication reference is made to the above article in Philips TDS Review, Vol. 46, No. 1, March 1988, more specifically, pp. 33 and 34 where the basic communication is described. Only when basic communication between two units proves to be possible, will it be possible to have active communication between these units.

As has been described in the above article, the units involved in establishing basic communication between two units are always arranged in a master-slave combination. The master unit initiates sending a scout message to the slave unit over a plurality (usually 2) of possible routes, after which the called unit returns a scout reply message over one of these routes. Then the SAS-CH in the master unit sends a hello start message to the slave unit which message comprises the code numbers belonging to the three active communication levels at which this unit can communicate in addition to the information about the selected route. The SAS-CH of the master unit also indicates in this message whether this unit is entitled or not to communicate at the different levels. The SAS-CH of the slave unit receiving this hello start message lays down the address of the selected route in a route table and remembers the code numbers of the master unit for the various communication levels and also whether the master unit is allowed to communicate at these various levels. Subsequently, the slave unit sends out a hello-start reply message in which the code numbers for the various communication levels for the slave unit are included as well as the information whether the slave unit is allowed to communicate at various levels. The code numbers and this information are recollected by the receiving master unit.

If, in a system in which the communication between a pair of units has already been started, the operator wishes to introduce a change in the level or the levels at which this unit is allowed or not allowed to communicate with the other unit, this control information may be transmitted at the basic communication level either by means of a separate message or included in the hello messages which are constantly exchanged between the units in a running system, as has also been described in the above article.

In this manner each SAS-CH of a unit remembers for each further unit in the network with which communication takes place at a basic level for each communication level whether:

1. The communication is compatible or not. This is to say that it is remembered whether for any combination of this unit with a further unit communication is allowed at a specific level which is determined by the fact whether the code numbers match for that level;
2. Communication in the unit itself is forbidden or not, which can be determined by the operator;
3. Communication in the other unit is forbidden or not. This information, as has been described hereinbefore, is incorporated in the hello-start message from the other unit and may, as has been described hereinbefore, be modified by the operator at a later stage.

Based on these three items, the SAS-CH of each unit determines the communication status of each level for communication with the other unit, that is to say, whether communication is possible or not. Communication is possible only when there is compatibility at the level involved, when communication at the relevant level is allowed to the unit as such, when it is also allowed to the other unit and when there is communication at all further lower levels including the basic level.

As has been explained hereinbefore, the information on whether communication between specific pairs of units is possible either or not at specific higher levels in the SAS-CH of all units has already been laid down in the case of basic communication; the basic communication forms the lowest level. The higher levels form the active communication which, for example, comprises three levels, whereas for specific use it is possible to split up the active communication into more or possibly fewer levels.

The first level of the active communication comprises the communication between an operator and a unit. In this context it is a matter of communication between two units, for one unit to ask to another whether the latter has errors and to be able to read this at the first unit. The first level also includes the extension by new units by means of communication between an operator and a unit. The second level comprises, for example, the testing of the channels between the units, whereas the third and highest level deals with the operational use of the units, thus the actual communicating. A selection is made in favour of a number of hierarchically different levels because, for example, the second level, testing the units, makes no sense when first level communication, during which it is possible to read whether a specific unit operates properly or not, is impossible. Neither does it make sense to telephone when it is impossible to check periodically whether the various units and the connections between them still operate properly.

As has been explained hereinbefore, as a result of the measures according to the invention, a fully integrated telecommunication network is fully protected against the presence of incompatible software and it is possible to incorporate a new unit in the network step-by-step. For example, initially only communication at the active first level may be permitted during which the new unit can be tested and the most recent data can be input, without creating the possibility that the new unit may affect the further operation of the network. By further permitting communication at the levels 1 and 2, the communication channel between the units can be fully tested whereas, finally, when everything is all right, communication at level 3 can be permitted, so that the unit has been made operational in the network.

I claim:

1. Telecommunication network, more specifically a telephone network, which comprises a number of units interconnected by means of transmission lines, each unit comprising a switching module, a central module and at least a single peripheral module to which user gates can be connected, characterised in that a number of progressively higher levels are assigned to the control communication between any pair of units, in that in each unit code numbers are stored for each level with the exception of the lowest level, and in that means are provided for allowing communication between a pair of units at a specific level only if the code numbers of these two units match for the relevant level and if communication between these units already takes place at all lower levels.

2. Telecommunication network as claimed in claim 1, characterised in that each unit comprises means for bringing the unit into a condition in which this unit is forbidden to communicate at a specific level.

3. Telecommunication network as claimed in claim 1, characterised in that means are provided for exchanging code numbers for the various levels already when communication is being established between two units at the lowest level, whereas each unit comprises means for storing the code numbers of a further unit.

4. Telecommunication network as claimed in claim 1, characterised in that
   each unit comprises means for bringing the unit into a condition in which this unit is forbidden to communicate at a specific level; and further comprising
   means for exchanging code numbers for the various levels already when communication is being established between two units at the lowest level, and that
   each unit comprises means for storing the code numbers of a further unit.

5. Telecommunication network as claimed in claim 4, characterised in that when establishing communication between two units at the lowest level, information on whether the other unit is allowed to communicate at the level concerned is transmitted for the various levels.

6. Telecommunication network as claimed in claim 5, characterised in that after communication has been established between two units, information to revoke a permission or prohibition originally given to communicate at a specific level may be transmitted at the lowest level.

7. Unit suitable for use in a telecommunication network as claimed in claim 1, this unit comprising a switching module, a central module and at least a single peripheral module to which user gates can be connected, characterised in that a number of progressively higher levels are assigned to the control communication between this unit and further units, in that in this unit code numbers are stored for each level with the exception of the lowest level, and in that means are provided for allowing communication between this unit and a further unit at a specific level only if the code numbers of these two units match for the relevant level and if communication between these units already takes place at all lower levels.

8. Unit as claimed in claim 7, characterised in that this unit comprises means for bringing this unit into a state in which this unit is forbidden to communicate at a specific level.

9. Unit as claimed in claim 7, characterised in that this unit comprises means for exchanging the code numbers for the different levels already when communication is established between this unit and a further unit at the lowest level and in that this unit comprises means for storing code numbers of a further unit.

10. Unit as claimed in claim 7 further comprising
    means for bringing this unit into a state in which this unit is forbidden to communicate at a specific level;
    means for exchanging the code numbers for the different levels already when communication is established between this unit and a further unit at the lowest level; and
    means for storing code numbers of a further unit.

11. Unit as claimed in claim 10, characterised in that when communication between this unit and a further unit is established at the lowest level, information on whether this unit is allowed to communicate at the level concerned is simultaneously transmitted for various levels.

12. Unit as claimed in claim 11, characterised in that after communication has been established between this unit and a further unit information can be transmitted at the lowest level to revoke a permission or prohibition originally given to communicate at a specific level.

* * * * *